United States Patent
Jayadevan et al.

(10) Patent No.: US 8,271,663 B2
(45) Date of Patent: Sep. 18, 2012

(54) SYSTEM AND METHOD FOR MULTIPLE ADDRESS OF RECORD REGISTRATION USING A SINGLE IMPLICIT SIP REQUEST

(75) Inventors: Ganesh Jayadevan, Bangalore (IN); Carleton Moon Luck, Jr., Apex, NC (US); Pandit Panburana, Cary, NC (US); Vikas Vashisht, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 934 days.

(21) Appl. No.: 11/831,467

(22) Filed: Jul. 31, 2007

(65) Prior Publication Data

US 2009/0037590 A1 Feb. 5, 2009

(51) Int. Cl.
*G06F 15/16* (2006.01)
(52) U.S. Cl. .................. 709/228; 709/227; 709/245
(58) Field of Classification Search .............. 709/227, 709/228, 245
See application file for complete search history.

(56) References Cited

U.S. PATENT DOCUMENTS

| | | | | |
|---|---|---|---|---|
| 6,161,109 | A | 12/2000 | Matamoros et al. | 707/203 |
| 7,123,700 | B1 * | 10/2006 | Weaver et al. | 379/88.19 |
| 2002/0147818 | A1 * | 10/2002 | Wengrovitz | 709/228 |
| 2004/0243680 | A1 * | 12/2004 | Mayer | 709/206 |
| 2005/0015492 | A1 * | 1/2005 | Kumbalimutt et al. | 709/226 |
| 2005/0129211 | A1 * | 6/2005 | Gallagher et al. | 379/265.02 |
| 2006/0072523 | A1 * | 4/2006 | Richardson et al. | 370/338 |
| 2006/0183491 | A1 * | 8/2006 | Gundu et al. | 455/518 |
| 2006/0245403 | A1 | 11/2006 | Kumar | 370/338 |
| 2007/0153777 | A1 * | 7/2007 | Coulas et al. | 370/356 |
| 2008/0062863 | A1 * | 3/2008 | Ginde | 370/221 |
| 2008/0080527 | A1 * | 4/2008 | Dorenbosch | 370/401 |
| 2008/0089290 | A1 | 4/2008 | Coulas et al. | 370/331 |
| 2008/0089308 | A1 * | 4/2008 | Jentz et al. | 370/342 |
| 2008/0125114 | A1 * | 5/2008 | Dorenbosch | 455/433 |
| 2008/0168540 | A1 * | 7/2008 | Agarwal et al. | 726/5 |
| 2008/0299969 | A1 * | 12/2008 | Shatsky | 455/435.1 |
| 2009/0003325 | A1 * | 1/2009 | Lee et al. | 370/353 |
| 2009/0037564 | A1 | 2/2009 | Jayadevan et al. | 709/222 |
| 2009/0038000 | A1 | 2/2009 | Jayadevan et al. | 726/14 |
| 2009/0052436 | A1 * | 2/2009 | Kotera et al. | 370/352 |
| 2009/0222575 | A1 * | 9/2009 | Goodman | 709/238 |

OTHER PUBLICATIONS

Patent Pending Application entitled *System and Method for Multiple Address of Record Registration Using a Single Explicit SIP Request* by Ganesh (nmi) Jayadevan, et al.; 26 total ppages, filed Jul. 31, 2007.
Patent Pending Application entitled *System and Method for Multiple Address of Record Deregistration Using a Single SIP Request* by Ganesh (nmi) Jayadevan, et al.; 25 total pages, filed Jul. 31, 2007.
*USPTO; Office Action* for U.S. Appl. No. 11/831,529, filed Jul. 31, 2007 in the name of Ganesh Jayadevan; 19 pages.

(Continued)

*Primary Examiner* — Mohamed Wasel
(74) *Attorney, Agent, or Firm* — Baker Botts L.L.P.

(57) ABSTRACT

A method for registering multiple addresses of record comprises receiving a session initiation protocol register request, the session initiation protocol register request comprising a unique identifier of a session initiation protocol endpoint and a contact address for the session initiation protocol endpoint. The method proceeds by retrieving one or more addresses of record associated with the unique identifier of the session initiation protocol endpoint. The method further comprises associating each of the one or more addresses of record with the contact address for the session initiation protocol endpoint.

18 Claims, 3 Drawing Sheets

OTHER PUBLICATIONS

*USPTO; Notice of Panel Decision from Pre-Appeal Brief Review* for U.S. Appl. No. 11/831,529 in the name of Ganesh Jayadevan; 2 pages, Dec. 17, 2010.
*USPTO; Examiner's Answer* for U.S. Appl. No. 11/831,529 in the name of Ganesh Jayadevan; 21 pages, Mar. 25, 2011.
*USPTO; Office Action* for U.S. Appl. No. 11/831,529, filed Jul. 31, 2009 in the name of Ganesh Jayadevan; 18 pages.
*USPTO; Office Action* for U.S. Appl. No. 11/831,359, filed Jul. 31, 2009 in the name of Ganesh Jayadevan; 20 pages.
*USPTO; Office Action* for U.S. Appl. No. 11/831,529, filed Jul. 31, 2009 in the name of Ganesh Jayadevan; 17 pages.
*USPTO; Office Action* for U.S. Appl. No. 11/831,359, filed Jul. 31, 2009 in the name of Ganesh Jayadevan; 15 pages.

\* cited by examiner

FIG. 2

| CONTACT ADDRESS | ADDRESS OF RECORD (AOR) | ... |
|---|---|---|
| sip:1234567890@PHONE25.rtp.cisco.com | sip:user1@cisco.com | ... |
| sip:1234567890@PHONE25.rtp.cisco.com | sip:techsupport@.cisco.com | ... |
| sip:1234567890@PHONE25.rtp.cisco.com | sip:2149098392@.cisco.com | ... |
| sip:john.smith@10.10.10.3:5060 | sip:john.smith@cisco.com | ... |
| sip:10.10.10.1:5060 | sip:jane.doe@cisco.com | ... |
| sip:ua55.example.com | sip:user@example.com | ... |
| ... | ... | ... |

FIG. 3

| IDENTIFIER | ADDRESS OF RECORD (AOR) | CONTACT ADDRESS | DEREGISTER | ... |
|---|---|---|---|---|
| 12:34:56:78:90:ab | sip:user1@cisco.com | sip:1234567890@phone25.rtp.cisco.com | N | ... |
| 12:34:56:78:90:ab | sip:2149098392@.cisco.com | sip:1234567890@phone25.rtp.cisco.com | N | ... |
| 12:34:56:78:90:ab | sip:techsupport@.cisco.com | sip:1234567890@phone25.rtp.cisco.com | N | ... |
| ... | ... | ... | ... | ... |

SYSTEM AND METHOD FOR MULTIPLE ADDRESS OF RECORD REGISTRATION USING A SINGLE IMPLICIT SIP REQUEST

TECHNICAL FIELD OF THE INVENTION

This invention relates in general to telecommunications, and more particularly to a system and method for multiple address of record registration using a single implicit session initiation protocol (SIP) request.

BACKGROUND OF THE INVENTION

Typically, a session initiation protocol (SIP) endpoint registers with a registrar server when the SIP endpoint first join a SIP system. This registration requires that the SIP endpoint transmit the address of record that is to be associated with it. If a SIP endpoint needs to have more than one address of record associated with it, the SIP endpoint must transmit a discrete register request for each address of record. By having to register each address of record, network resources are burdened. In the case of failover, when several SIP endpoints must switch to different registration servers, the burden on the network is especially heavy. As a result, the time it takes to register multiple SIP endpoints after a failover is long and the network's scalability is reduced when several SIP endpoints have multiple addresses of record associated with them.

SIP endpoints typically have multiple SIP addresses of record (AORs) to be registered. Recent technology allows an increasing number of SIP AORs to be registered per SIP endpoint. In startup, failover, and fallback scenarios, a flurry of messages will be sent to a SIP registration server, which will severely limit the scalability and performance of the SIP registration server. Furthermore, failover and fallback will take a much longer time to complete, potentially affecting the availability of SIP registration severs. With frequent registrations, large amounts of CPU processing capacity and bandwidth will be consumed by the single registration of each SIP AOR by a SIP endpoint.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is one embodiment of current bindings 142 used in the system of FIG. 1;

FIG. 3 is one embodiment of an address lookup table used to associate unique identifications of the SIP endpoint devices with addresses of record to be used in the system of FIG. 1;

DESCRIPTION OF EXAMPLE EMBODIMENTS

Overview

One embodiment of the present invention is a method for registering multiple addresses of record. The method comprises receiving a session initiation protocol register request, the session initiation protocol register request comprising a unique identifier of a session initiation protocol endpoint and a contact address for the session initiation protocol endpoint. The method proceeds by retrieving one or more addresses of record associated with the unique identifier of the session initiation protocol endpoint. The method further comprises associating each of the one or more addresses of record with the contact address for the session initiation protocol endpoint.

Various embodiments of the invention may have none, some, or all of the technical advantages described herein. One advantage of the present invention is that it permits scalability and increases performance of SIP registration servers. By allowing multiple AORs to be registered in conjunction with receiving a single SIP register message, a SIP registration server may handle far fewer SIP register requests than it would handle if each AOR were communicated in an individual register message. As a result, a SIP registration server may register an increased number of SIP endpoints and reduce or eliminate performance degradation. In addition, a SIP registration server may register SIP endpoints faster than it could before. Furthermore, with fewer discrete SIP register requests sent, the required amount of CPU processing capacity and network bandwidth may be reduced. Another technical advantage is that the present invention adds control from the SIP endpoint to select which AORs are to be registered.

Other technical advantages of the present invention will be readily apparent to one skilled in the art from the description and the appended claims.

DESCRIPTION

Figure 1:
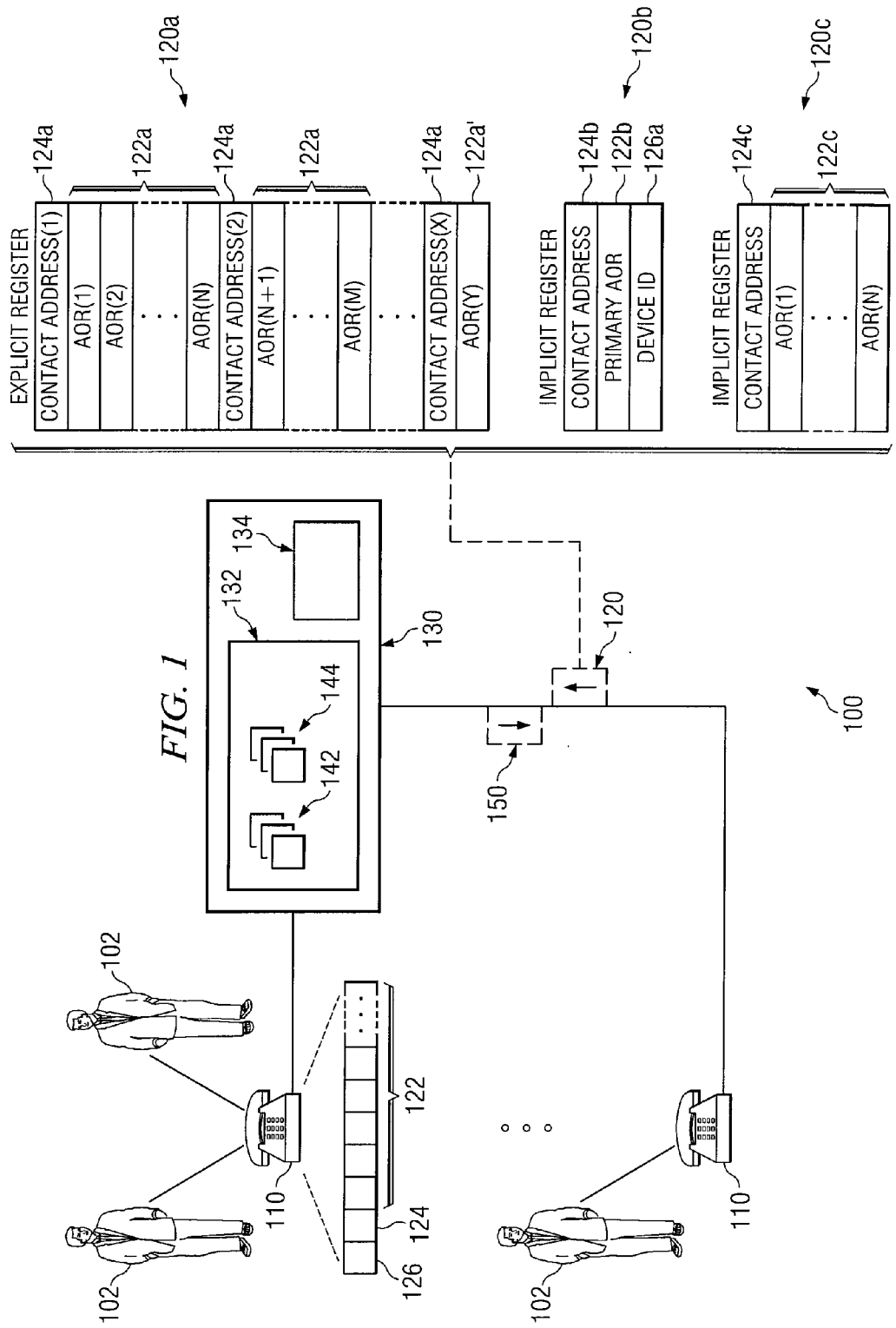
FIG. 1 is a simplified block diagram of a session initiation protocol (SIP) system, in accordance with one embodiment of the present invention.

FIG. 1 is a simplified block diagram of a session initiation protocol (SIP) registration system 100, which includes SIP endpoints 110 and SIP registrar server 130. Each SIP endpoint 110 has a single contact address 124 and may be associated with one or more addresses of record (AORs) 122. When registering multiple AORs 122, a particular SIP endpoint 110 may communicate a single bulk register message 120 to SIP registrar server 130, which in turn registers multiple AORs 122 without discrete register requests for each AOR 122. There are two types of bulk messages 120 used to register AORs 122, and a third type of bulk message 120 used to deregister AORs 122. The first type of message is explicit bulk register message 120a, in which each AOR 122 to be registered is explicitly included in the message. As explained later, some embodiments use indices as proxies for the AORs 122. The second type of message is implicit bulk register message 120b, in which a unique device identification 126 of a particular SIP endpoint 110 is included in the implicit bulk register message 120b. Registrar server 130 uses device identification 126 to lookup the AORs 122 to be registered for the SIP endpoint 110. The third type of message, bulk deregister message 120c, is discussed in detail later.

Use of bulk registration may have many significant improvements over prior uses of multiple discrete SIP requests to register or deregister multiple AORs 122. Advantages include bandwidth efficiency, better performance and scalability achieved on the server, and more control to the SIP endpoint. The various embodiments of the present invention may exhibit some, none, or all of these advantages.

A user 102 can move between SIP endpoints 110 or even be associated with multiple SIP endpoints 110 at one time while retaining the same AOR 122. SIP uses bindings to determine the location of particular users 102 in system 100. One of the purposes of registration is to create bindings, which are associations of AORs 122 with contact addresses 124 of a SIP endpoint 110. Generally, an AOR 122 represents an identity of a user 102 of a particular SIP endpoint 110 and is generally a long-term identity having no dependency on any device. A contact address 124, on the other hand, is usually device-specific. Both AORs 122 and contact addresses 124 are uniform resource identifiers (URIs) and thus may take on many forms. AORs 122 are generally of the form "SIP:user1@example.com," or "SIP:8506237454@example.com." Contact addresses 124 generally take a form similar to "SIP:contact1@us1.machines.example.com."

A SIP endpoint 110 may be any combination of hardware, software, and/or encoded logic that provides communication services to a user 102. For example, SIP endpoints 110 include telephones, computers running telephony software, video monitors, cameras, or any other communication hardware, software, and/or encoded logic that supports the communication of packets of media or frames using SIP system 100. SIP endpoints 110 also include call agents, unattended or automated systems, telephony gateways or other intermediate components, or other devices that can establish media sessions. SIP endpoints 110 are capable of generating and transmitting to a registrar server 130 bulk messages 120.

Bulk messages 120 allow SIP endpoints 110 to register and deregister a plurality of AORs 122 with registrar server 130 using a single SIP request. There are at least three types of bulk messages 120, namely, explicit bulk register message 120a, implicit bulk register message 120b, and bulk deregister message 120c. Explicit bulk register messages 120a and implicit bulk register messages 120b are SIP requests that may be used by the registrar server 130 to create a plurality of bindings at one time. Bulk deregister messages 120c are SIP requests that may be used by the registrar server 130 to remove a plurality of bindings.

Explicit bulk register message 120a, used in some embodiments, may contain a contact address 124a for SIP endpoint 110 and a plurality of AORs 122a that are to be registered for SIP endpoint 110. Explicit bulk register message 120a may originate with SIP endpoint 110 and may be communicated to SIP registrar server 130. For each AOR 122a contained in explicit bulk register message 120a, SIP registrar server 130 creates a binding of each AOR 122a to the contact address 124 of SIP endpoint 110. In some embodiments, explicit bulk register message 120a may include multiple contact addresses 124a, and multiple sets of AORs 122a to be associated with their respective contact address. Each set of AORs 122a may contain one or more AORs 122a. Some embodiments utilize indices in place of AORs 122a. Each index act as a proxy for a particular AOR 122a. In embodiments that use indices, both the SIP endpoint 110 and the server 130 may contain information relating each index to a particular AOR 122a. Some embodiments that utilize indices allow the explicit bulk register message 120a to include ranges of indices or an indicator signifying that all AORs 122a indexed for a particular SIP endpoint 110 should be registered.

Implicit bulk register message 120b, used in some embodiments, may contain a device identification 126a of a particular SIP endpoint 110. One example of a device identification 126a is a Media Access Control (MAC) address, which usually takes a form similar to "12:E1:49:D3:17:82." Any other unique identifier of a SIP endpoint 110 may be used in the present invention as the device identification 126a. In some embodiments, the message 120b may also comprise the contact address 124b for SIP endpoint 110 and a primary AOR 122b for SIP endpoint 110. Implicit bulk register message 120b may originate with SIP endpoint 110 and may be communicated to SIP registrar server 130. In some embodiments, SIP registrar server 130 retrieves one or more AORs 122 associated with the device identification 126a of SIP endpoint 110. Using the retrieved list of AORs 122, SIP registrar server 130 creates bindings of the contact address 124 of SIP endpoint 110 with each of the retrieved AORs 122.

Bulk deregister message 120c, used in some embodiments, may include a contact address 124c for the SIP endpoint 110 and a plurality of AORs 122c to be deregistered for SIP endpoint 110. SIP endpoint 110 may create a bulk deregister message 120c and communicate it to registrar server 130. In some embodiments, registrar server 130 removes one or more current bindings 142 based on AORs 122c contained in bulk deregister message 120c. In implicit registration embodiments, bulk deregister message 120c is used further to prevent AORs 122c from being re-registered in future implicit registration requests, as explained below, using implicit addresses 144.

Some embodiments structure a bulk message 120 in such a way as to allow SIP registrar servers 130 that do not support bulk registration or deregistration to still register or deregister the first AOR 122 contained in the bulk message 120. Bulk registration messages 120 may contain other fields as prescribed by SIP specifications.

SIP registrar server 130 comprises a memory 132 and a processor 134 operable to receive and process bulk messages 120. In processing bulk messages 120 from SIP endpoint 110, SIP registrar server 130 associates the address, identity, or location of a particular SIP endpoint 110 with the AORs 122 of the users 102 of the particular SIP endpoint 110. After completing a successful registration for a SIP endpoint 110, registrar server 130 may communicate an acknowledgement 150 to the SIP endpoint 110. SIP registrar server 130 may also satisfy requirements prescribed by SIP specifications. Some or all of the functionality described with respect to the registrar server 130 may be performed by other elements in system 100.

Registrar server 130 may provide the location of SIP endpoints 110 to components of SIP system 100 when suitable to facilitate communication between SIP endpoints 110 and other components of SIP system 100. Registrar server 130 may create, store, and communicate address bindings that associate various AORs 122 with various SIP endpoints 110. Once bindings are created, a device in SIP system 100 needing to route an incoming request for a particular AOR 122 may communicate with registrar server 130 for the appropriate contact address 124 to which to route the request.

To facilitate the creation of bindings, registrar server 130 may contain current bindings 142 and implicit addresses 144. Current bindings 142 are associations or bindings of particular contact addresses 124 with particular AORs 122 used to indicate that the AORs 122 are currently registered with a particular SIP endpoint 110. When an AOR 122 are registered for a SIP endpoint 110, an additional current binding 142 may be created. Similarly, a particular AOR 122 may be deregistered from a SIP endpoint 110 by removing a current binding 142 corresponding to the association of the particular AOR with the SIP endpoint 110. Registrar server 130 may search the current bindings 142 when processing a request from another device in system 100 in need of the contact address 124 for a particular AOR 122.

In conjunction with current bindings 142, implicit addresses 144 may be utilized in implicit registration embodiments. Implicit addresses 144 associate device identifications 126 of various SIP endpoints 110 with one or more AORs 122. For each AOR 122 contained in implicit addresses 144, implicit addresses 144 also indicates whether the AOR 122 has been deregistered for a particular SIP endpoint 110. When an implicit bulk register message 120b from a particular SIP endpoint 110 is processed, system 100 retrieves from implicit addresses 144 the one or more AORs 122 associated with the device identification 126a of SIP endpoint 110 that have not been deregistered. System 100 may then create bindings for the contact address 124b to each of the AORs 122 by creating additional current bindings 142.

In operation, SIP endpoint 110 may create and transmit a bulk registration message 120 to registrar server 130. In explicit registration embodiments, SIP endpoint 110 may transmit an explicit bulk register message 120a containing the contact address 124 of SIP endpoint 110 and the AORs 122 to be bound to SIP endpoint 110. Registrar server 130 receives the explicit bulk register message 120a. For each AOR 122 contained in explicit bulk register message 120a, registrar server 130 may add a current binding 142 associating the contact address 124 with each AOR 122a. Once the binding is created, registrar server 130 may transmit an acknowledgement 150 to SIP endpoint 110 indicating that the registration was successful. This acknowledgement 150 may list all the AORs 122 that are registered with SIP endpoint 110, or, in some embodiments may list only the AORs 122 that were registered using the explicit bulk register message 120a.

In implicit registration embodiments of the present invention, SIP endpoint 110 may create and transmit an implicit bulk register message 120b containing a device identification 126a of SIP endpoint 110. Registrar server 130 may then retrieve from implicit addresses 144 one or more AORs 122 that are associated with the device identification 126a that have not been deregistered. Registrar server 130 may then create bindings for each AOR 122 to SIP endpoint 110 using current bindings 142.

Depending on whether the embodiment involves implicit registration, the deregistration process may operate differently. In implicit registration embodiments, SIP endpoint 110 creates and transmits to registrar server 130 a bulk deregister message 120c containing one or more AORs 122c. Upon receipt, registrar server 130 may remove the current bindings 142 of each AOR 122c. To prevent the deregistered AORs 122c from being re-registered the next time SIP endpoint 110 implicitly bulk registers, registrar server 130 may also place information in implicit addresses 144 indicating that a particular AOR 122c has been deregistered.

In embodiments not involving implicit bulk registration, when registrar server 130 receives a message to deregister one or more AORs 122c for SIP endpoint 110, registrar server 130 may remove for each AOR 122c a current binding 142, without the need to prevent future re-registration of the AORs 122c.

After AORs 122 have been registered for a SIP endpoint 110, the registrar server may handle location requests from other devices in system 100 attempting to route a call to a address of record, but needing the address of the particular SIP endpoint 110 with which the address of record is associated. Such a location request, when received by the registrar server 130, may contain a particular AOR. Using the current bindings 142, registrar server 130 may return the corresponding contact address 124 in a response to the requesting device.

FIG. 2 illustrates one example of current bindings 142 in accordance with one embodiment of system 100. In general, current bindings 142 may be stored in a two-dimensional data structure containing a contact address 124 column 200, addresses of record column 210, and records 220. Current bindings 142 associate AORs 122 registered for SIP endpoints 110 with contact addresses 124 of the respective SIP endpoints 110. Each record 220 corresponds to a current binding 142 of a particular AOR 122 with a particular contact address 124. Current bindings 142 allow multiple AORs 122 to be associated with a single SIP endpoint 110. Current bindings 142 may also allow multiple SIP endpoints 110 to be associated with a single AOR 122.

In operation, data in current bindings 142 may be manipulated according to the following examples. Suppose SIP endpoint 110, with contact address 124 "SIP:1234567890@phone25.rtp.cisco.com," transmits an explicit bulk register message 120a containing three AORs 122 "SIP:user1@cisco.com," "SIP:techsupport@cisco.com," and "SIP:2149098392@cisco.com." To bind the example AORs 122 to the example contact address 124, two records 220 may be added to the current bindings 142. The first record 220a may contain "SIP:1234567890@phone25.rtp.cisco.com" in the contact address 124 column 200 and "SIP:user1@cisco.com" in the AOR 122 column 210. The second and third records 220b and 220c may both contain "SIP:1234567890@phone25.rtp.cisco.com" in the contact address 124 column 200 and "SIP:techsupport@cisco.com" and "SIP:2149098392@cisco.com," respectively, in the AOR 122 column 210. If an element in system 100 needed the contact address 124 for an incoming message destined for "SIP:user1@cisco.com," then system 100 may search the records 220 for "SIP:user1@cisco.com" in the AOR 122 column 210 and return the value stored in the contact address 124 column 200, which for this example is "SIP:1234567890@phone25.rtp.cisco.com." Suppose further that the example SIP endpoint 110 transmits a deregister message 120c containing AOR 122 "SIP:2149098392@cisco.com." System 100 may then locate and remove the record 220c containing "SIP:2149098392@cisco.com" in the AOR 122 column 210 and "SIP:1234567890@phone25.rtp.cisco.com" in the contact address 124 column 200. Once removed, a message destined for "SIP:2149098392@cisco.com" may not be routed to "SIP:1234567890@phone25.rtp.cisco.com."

In the illustrated embodiment, current bindings 142 are stored in a multi-dimensional data structure. However, current bindings 142 may be arranged in any appropriate format. In this example, each record 220 includes data, pointers, references, or any other identifiers of the AOR 122 and contact address 124. It will be understood that each record 220 may include none, some, or all of the example data. In one embodiment, each record 220 may include links, foreign keys, or pointers to another table. The data illustrated in current bindings 142 are merely exemplary and system 100 contemplates any other suitable data that allows system 100 to register or deregister a plurality of AORs 122 using a single SIP request. Moreover, current bindings 142 may be separated into multiple tables or files without departing from the scope of the invention.

FIG. 3 illustrates an example of implicit addresses 144 in accordance with one embodiment of system 100. In general, implicit addresses 144 is a two-dimensional data structure containing an identifier column 300, an AOR 122 column 310, a deregister column 320, contact address column 340, and records 330. In implicit registration embodiments, implicit addresses 144 are used to store data linking a device identification 126a of particular SIP endpoints 110 to a plurality of AORs 122. Each record 330 in implicit addresses 144 may be deactivated with the use of a deregister flag stored in deregister column 320. The deregister flag indicates whether the particular AOR 122 has been deregistered for a particular SIP endpoint 110. In the example embodiment, "N" represents that the deregister flag is not set and "Y" represents that it is set. Once the deregister flag is set for a particular AOR 122 of a particular SIP endpoint 110, system 100 will no longer retrieve, during implicit registration, that particular AOR 122 for that particular SIP endpoint 110 until that particular AOR 122 has been explicitly registered again. The identifier column 300 of implicit addresses 144 may contain any device identification 126a of SIP endpoint 110. One example of a device identification 126a is a MAC address.

In operation, data may be manipulated in implicit addresses 144 according to the following examples. Suppose implicit addresses 144 is already loaded with three records: 330a, 330b, and 330c. Suppose further that SIP endpoint 110 having a device identification 126a of "12:34:56:78:90:ab" and a contact address 124b of "SIP:1234567890@phone25.rtp.cisco.com" transmits an implicit bulk register message 120b. System 100 may access implicit addresses 144 and retrieve all the AORs 122 stored in the AOR 122 column 310 for records 330 containing "12:34:56:78:90:ab" in the identifier column 300 and "N" in the deregister column 320. In this example, the AORs 122 returned would be the AORs 122 stored in the three example records 330a, 330b, and 330c. System 100 may then, for each retrieved AOR 122, add a record 220 to the current bindings 142 containing the AOR 122 and the contact address 124 for SIP endpoint 110, as demonstrated by records 220a, 220b, and 220c of FIG. 2.

Suppose further that SIP endpoint 110 having a contact address 124c of "SIP:1234567890@phone25.rtp.cisco.com" transmits a bulk deregister message 120c containing AORs 122 "SIP:user1@cisco.com" and "SIP:2149098392@cisco.com." System 100, as part of processing the message 120c, may remove records 220a and 220c from the current bindings 142 of FIG. 2. System 100 may further set the value in the deregister column 320 to "Y" for records 330a and 330b. When SIP endpoint re-registers using implicit registration in the future, system 100 will not retrieve records where the deregister flag is set, which means that among records 330a-c only AOR 122 "SIP:techsupport@cisco.com" contained in record 330c may be retrieved. If the SIP endpoint 110, having a contact address 124c of "SIP:1234567890@phone25.rtp.cisco.com" re-registers AOR 122 "sip:user1@cisco.com," then system 100 may update record 330a with a "N" in the deregister column 320, which will allow that particular AOR 122 to be registered during the next implicit registration.

In the illustrated embodiment, implicit addresses 144 is a multi-dimensional data structure. However, implicit addresses 144 may be arranged in any appropriate format. In this example, each implicit addresses 144 record 330 includes data, pointers, references, or any other identifiers of the AOR 122, the device identification 126a, and the deregister flag. It will be understood that each implicit addresses 144 record 330 may include none, some, or all of the example data. In one embodiment, each implicit addresses 144 record 330 may include links, foreign keys, or pointers to another table. The data illustrated in implicit addresses 144 are merely exemplary and system 100 contemplates any other suitable data that allows system 100 to register or deregister a plurality of AORs 122 using a single SIP request. Moreover, implicit addresses 144 may be separated into multiple tables or files without departing from the scope of the invention.

Figure 4:
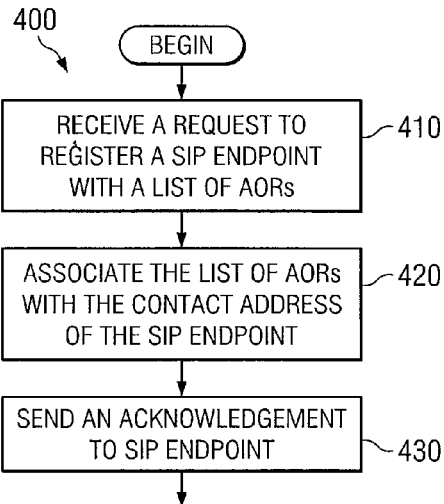
FIG. 4 is a flowchart illustrating one embodiment for explicitly registering multiple addresses of record using a single SIP register request.

FIG. 4 is a flowchart illustrating one embodiment for explicitly registering multiple addresses of record 122 using a single SIP register request. Method 400 generally depicts the steps for various aspects of explicitly registering multiple AORs 122 using a single SIP request from SIP endpoint 110.

The method 400 begins at step 410 where SIP endpoint 110 generates and communicates a SIP bulk register message 120, specifically a bulk explicit register message 120a. The register message 120a contains the contact address 124a for SIP endpoint 110 and a list of AORs 122a to be registered for the SIP endpoint 110. Registrar server 130 receives the register message 120a.

The method 400 then proceeds to step 420 where registrar server 130 creates bindings for contact address 124a with each of the AORs 122a in the list. Registrar server 130 adds current bindings 142 to associate the contact address 124 with each AOR 122a.

The method 400 then proceeds to step 430 where the registrar server 130 transmits an acknowledgment 150 to the SIP endpoint 110. This acknowledgment 150 indicates the successful registration of the AORs 122a. This message may contain the AORs 122a that were sent in the message 120a from SIP endpoint 110. After executing step 430, method 400 ends.

System 100 may perform steps not shown in FIG. 4. Likewise, system 100 may omit steps or perform steps in an order different from those shown in FIG. 4 while still being contemplated by the present invention. Method 400 is merely one embodiment of the claimed invention.

Figure 5:
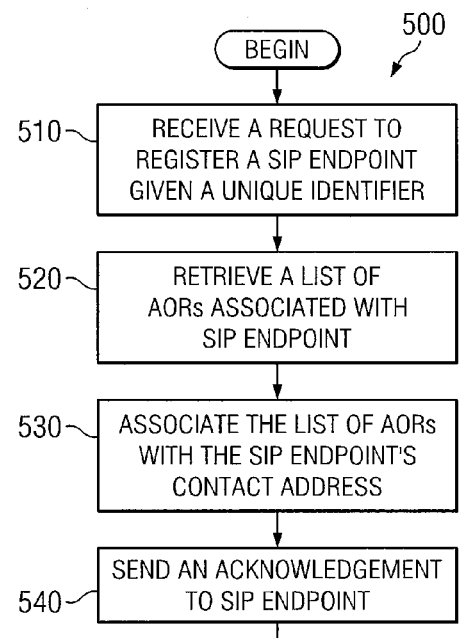
FIG. 5 is a flowchart illustrating one embodiment for implicitly registering multiple addresses of record using a single SIP register request.

FIG. 5 illustrates one example of the implicit registration process. Method 500 generally depicts the steps for various aspects of implicitly registering multiple AORs 122 using a single SIP request from SIP endpoint 110.

The method 500 begins at step 510 where SIP endpoint 110 generates and communicates a SIP bulk register message 120, specifically a bulk implicit register message 120b. The register message 120b contains a device identification 126a, and in some embodiments, contact address 124b and a primary AOR 122b. Registrar server 130 receives the register message 120a. The method 500 then proceeds to step 520 where registrar server 130 may retrieve from implicit addresses 144 one or more AORs 122 associated with the device identification 126a. The method 500 then proceeds to step 530 where registrar server 130 may create and add current bindings 142 for the contact address 124b with each of the AORs 122 in the list retrieved in step 520.

The method 500 then proceeds to step 540, where the registrar server 130 transmits an acknowledgment 150 to the SIP endpoint 110. This acknowledgment 150 may indicate the successful registration of the AORs 122. Acknowledgement 150 may also contain all the AORs 122 that were implicitly registered. After executing step 540, method 500 ends.

System 100 may perform steps not shown in FIG. 5. Likewise, system 100 may omit steps or perform steps in an order different from those shown in FIG. 5 while still being contemplated by the present invention. Method 500 is merely one embodiment of the claimed invention.

Figure 6:
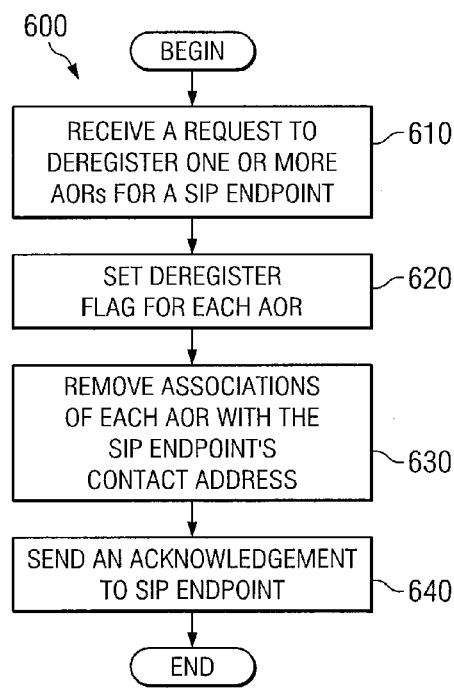
FIG. 6 is a flowchart illustrating one embodiment for deregistering multiple addresses of record using a single SIP deregister request.

FIG. 6 illustrates one example of the bulk deregistration process. Method 600 generally depicts the steps for various aspects of deregistering multiple AORs 122 using a single SIP request from SIP endpoint 110.

The method 600 begins at step 610 where SIP endpoint 110 generates and communicates a SIP bulk deregister message 120c. The bulk deregister message 120c contains the contact address 124 for SIP endpoint 110 and one or more AORs 122c to be deregistered for SIP endpoint 110. Registrar server 130 receives the deregister message 120c. The method 600 then proceeds to step 620 where registrar server 130 updates information in implicit addresses 144 indicating that the one or more AORs 122c associated with the SIP endpoint 110 have been deregistered. The method 600 then proceeds to step 630 where registrar server 130 removes current bindings 142 for the contact address 124 with each AOR 122c.

The method 600 then proceeds to step 640 where the registrar server 130 transmits an acknowledgment 150 to the SIP endpoint 110. This acknowledgment 150 indicates the successful deregistration of the AORs 122c. In some embodiments, prior to transmitting the acknowledgement 150, registrar server 130 retrieves all the AORs 122 registered for SIP endpoint 110 and includes the retrieved AORs 122 in acknowledgement 150.

System 100 may perform steps not shown in FIG. 6. Likewise, system 100 may omit steps or perform steps in an order different from those shown in FIG. 6 while still being contemplated by the present invention. Method 600 is merely one embodiment of the claimed invention.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method, comprising:
    receiving a session initiation protocol register request, the session initiation protocol register request comprising a unique identifier of a session initiation protocol endpoint and a contact address for the session initiation protocol endpoint;
    retrieving a plurality of addresses of record using the unique identifier of the session initiation protocol endpoint; and
    associating each of the plurality of addresses of record with the contact address for the session initiation protocol endpoint.

2. The method of claim 1, wherein the step of retrieving the plurality of addresses of record comprises:
    retrieving addresses of record associated with the unique identifier of the session initiation protocol endpoint that have not been explicitly deregistered for the session initiation protocol endpoint; and
    retrieving addresses of record that have been explicitly registered after being explicitly deregistered.

3. The method of claim 1, wherein the step of associating each of the plurality of addresses of record with the contact address for the session initiation protocol endpoint comprises:
    creating a first binding that associates a first of the plurality of addresses of record with the contact address for the session initiation protocol endpoint; and
    creating a second binding that associates a second of the plurality of addresses of record with the contact address for the session initiation protocol endpoint.

4. The method of claim 2, wherein the first binding is stored in a record of a table.

5. The method of claim 1, further comprising transmitting an acknowledgement to the session initiation protocol endpoint, wherein the acknowledgement indicates that the retrieved addresses of record have been associated.

6. The method of claim 5, wherein the acknowledgement further comprises a second plurality of addresses of record that were previously associated.

7. The method of claim 1, further comprising:
    receiving a session initiation protocol location request, wherein the session initiation protocol location request comprises an address of record from the plurality of addresses of record;
    retrieving the contact address for the address of record from the session initiation protocol location request; and
    communicating the contact address.

8. A server, comprising:
    a memory operable to store a plurality of addresses of record and a plurality of unique identifiers, each of the plurality of unique identifiers corresponding to a particular session initiation protocol endpoint; and
    a processor communicatively coupled to the memory and operable to:
        receive a session initiation protocol register request, the session initiation protocol register request comprising a unique identifier of a session initiation protocol endpoint and a contact address for the session initiation protocol endpoint;
        retrieve a plurality of addresses of record using the unique identifier of the session initiation protocol endpoint; and
        associate each of the plurality of addresses of record with the contact address for the session initiation protocol endpoint.

9. The server of claim 8, wherein to retrieve the plurality of addresses of record, the processor retrieves only those addresses of record associated with the unique identifier of the session initiation protocol endpoint that have not been deregistered for the session initiation protocol endpoint.

10. The server of claim 8, wherein:
    the processor:
        creates a first binding that associates a first address of record with the contact address; and
        creates a second binding that associates a second address of record with the contact address; and
    the memory stores the first binding and the second binding.

11. The server of claim 8, wherein the processor is further operable to transmit an acknowledgement to the session initiation protocol endpoint, wherein the acknowledgement indicates that the plurality of addresses of record that were retrieved have been registered.

12. The server of claim 8, wherein the processor is further operable to:
    receive a session initiation protocol location request, where the location request comprises an address of record from the plurality of addresses of record;
    retrieve the contact address for the address of record from the location request; and
    communicate the contact address.

13. A session initiation protocol endpoint comprising:
    a memory operable to store a unique identifier and a contact address for the session initiation protocol endpoint; and
    a processor communicatively coupled to the memory and operable to communicate a session initiation register request, the register request comprising the unique identifier and the contact address for the session initiation protocol endpoint, wherein the unique identifier is operable to be used to retrieve a plurality of addresses of record to be associated with the contact address.

14. A system, comprising:
    a session initiation protocol endpoint operable to communicate a session initiation protocol register request, the session initiation protocol register request comprising a unique identifier of the session initiation protocol endpoint and a contact address for the session initiation protocol endpoint; and a server communicatively coupled to the session initiation protocol endpoint and operable to:
  receive the request;
  retrieve a plurality of addresses of record using the unique identifier contained in the session initiation protocol request; and
  associate each of the plurality of addresses of record with the contact address for the session initiation protocol endpoint.

15. The system of claim 14, wherein the server is further operable to communicate an acknowledgement to the session initiation protocol endpoint, wherein the acknowledgement indicates that the retrieved addresses of record have been registered.

16. The system of claim 14, wherein the server retrieves only those addresses of record associated with the unique identifier of the session initiation protocol endpoint that have not been deregistered for the session initiation protocol endpoint.

17. The system of claim 14, wherein to associate addresses of record with the contact address, the server:
  creates a first binding that associates a first address of record with the contact address;
  creates a second binding that associates a second address with the contact address; and
  stores the first and second bindings.

18. The system of claim 16, wherein the server is further operable to:
  receive a session initiation protocol location request, where the location request comprises an address of record from the plurality of addresses of record;
  retrieve the contact address for the address of record from the location request; and
  communicate the contact address.

* * * * *